Figure 1:
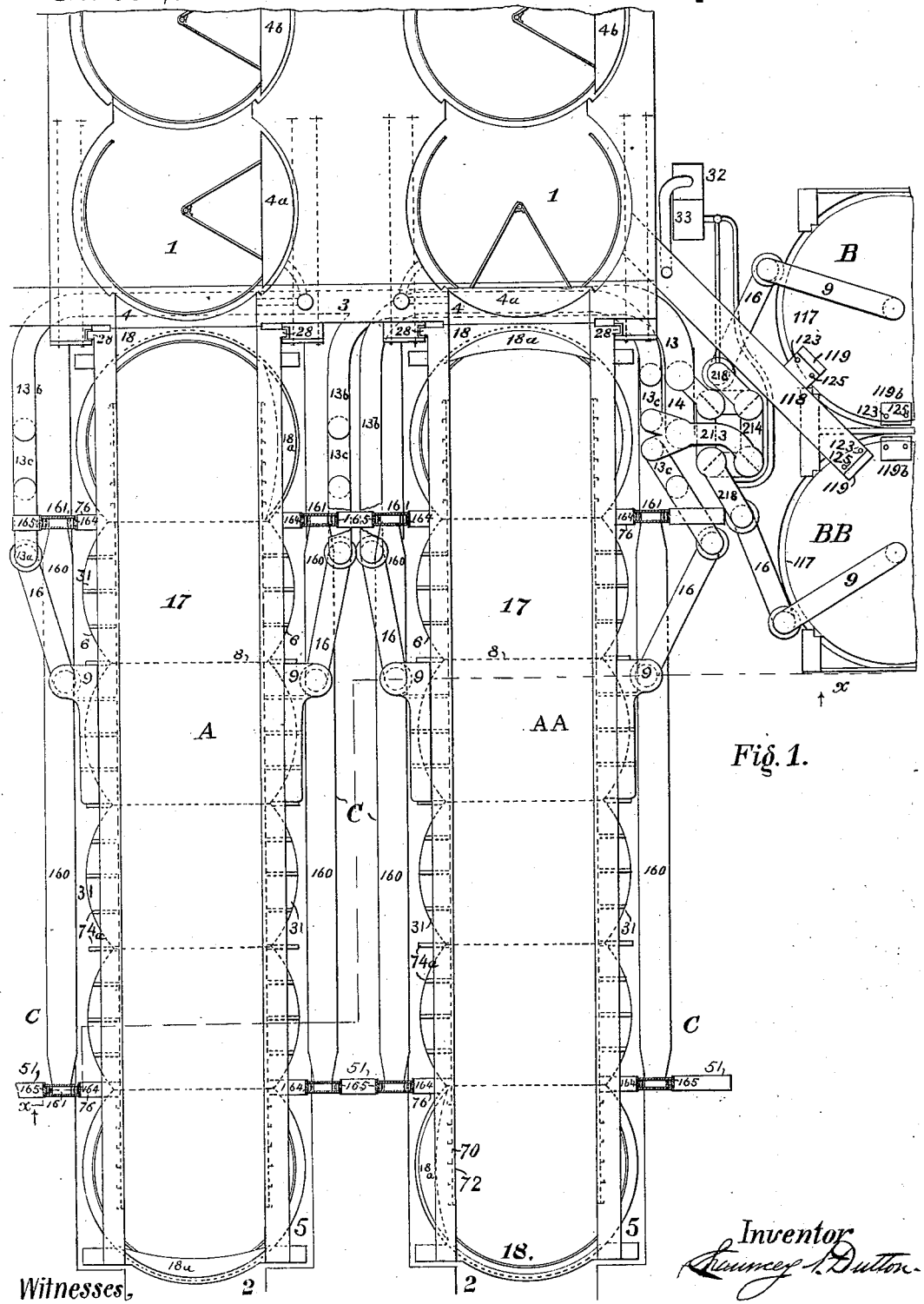

(No Model.) 6 Sheets—Sheet 1.

C. N. DUTTON.
PNEUMATIC BALANCE LOCK.

No. 557,566. Patented Apr. 7, 1896.

Witnesses,
Wm. A. Dutton
Julia M. Pond

Inventor
Chauncey N. Dutton

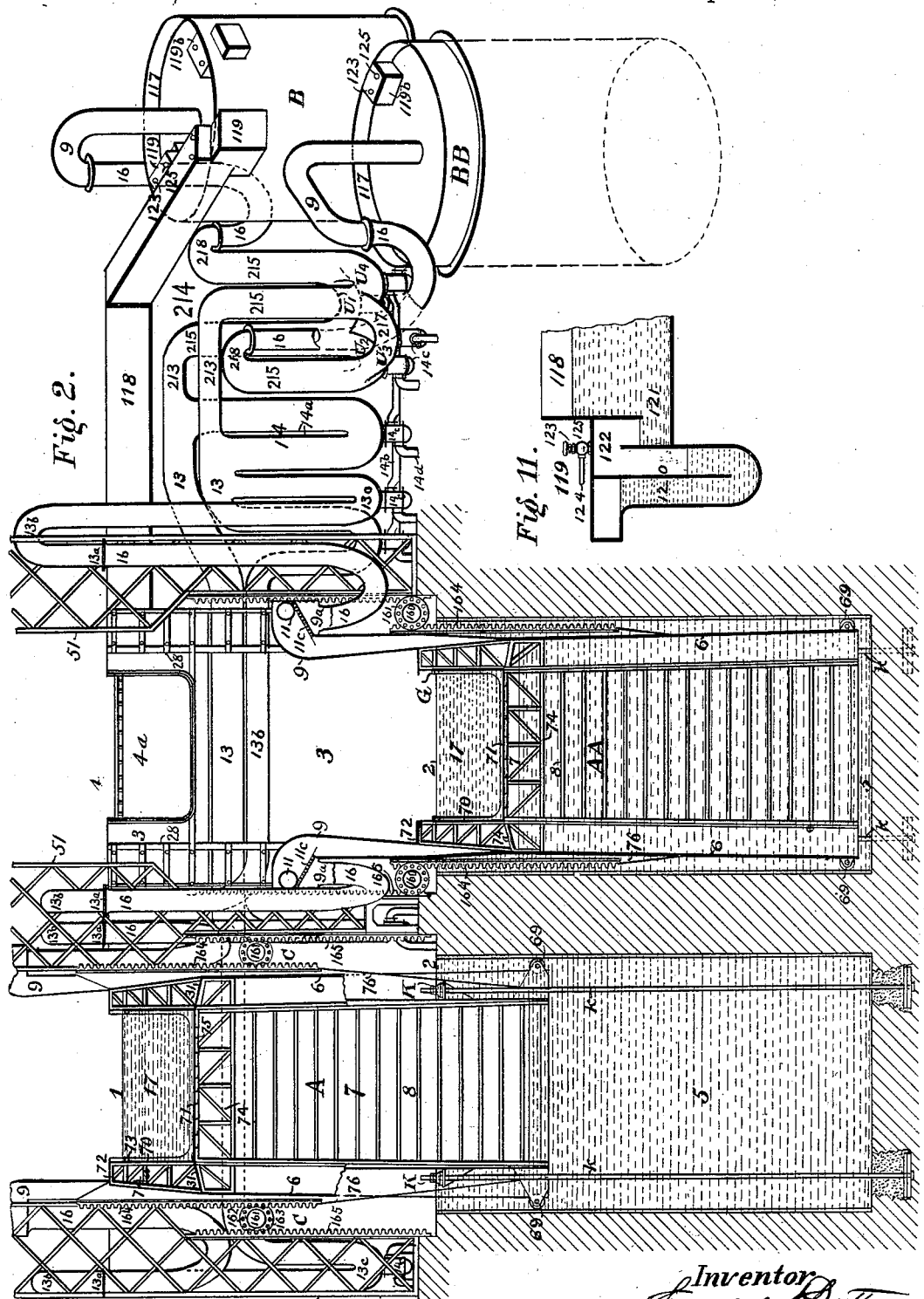

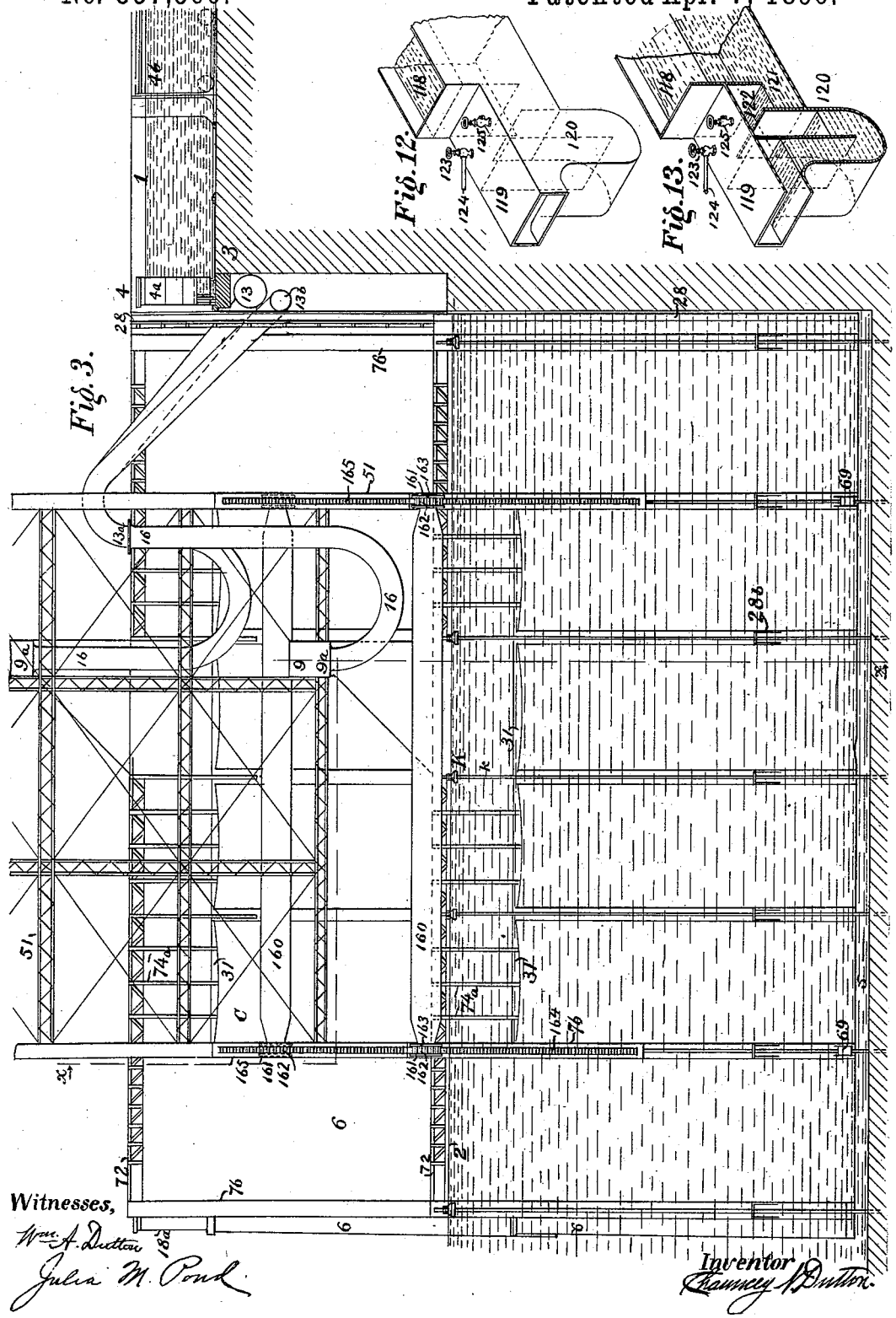

(No Model.)  6 Sheets—Sheet 4.
C. N. DUTTON.
PNEUMATIC BALANCE LOCK.
No. 557,566.  Patented Apr. 7, 1896.
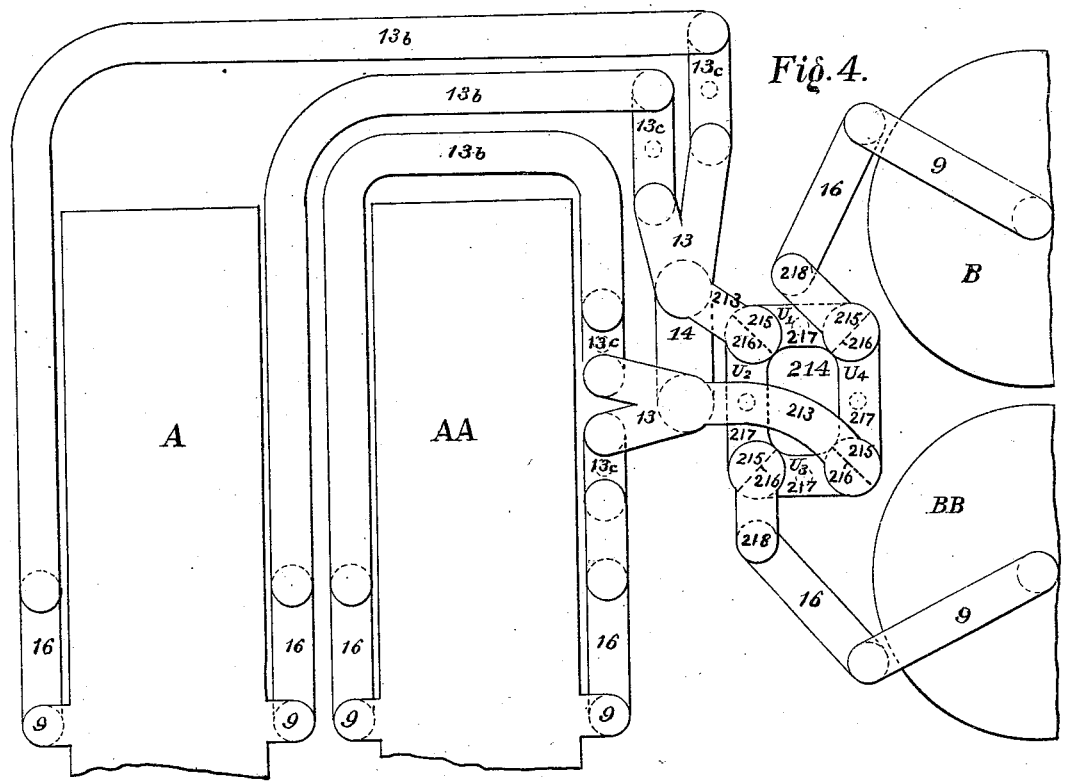
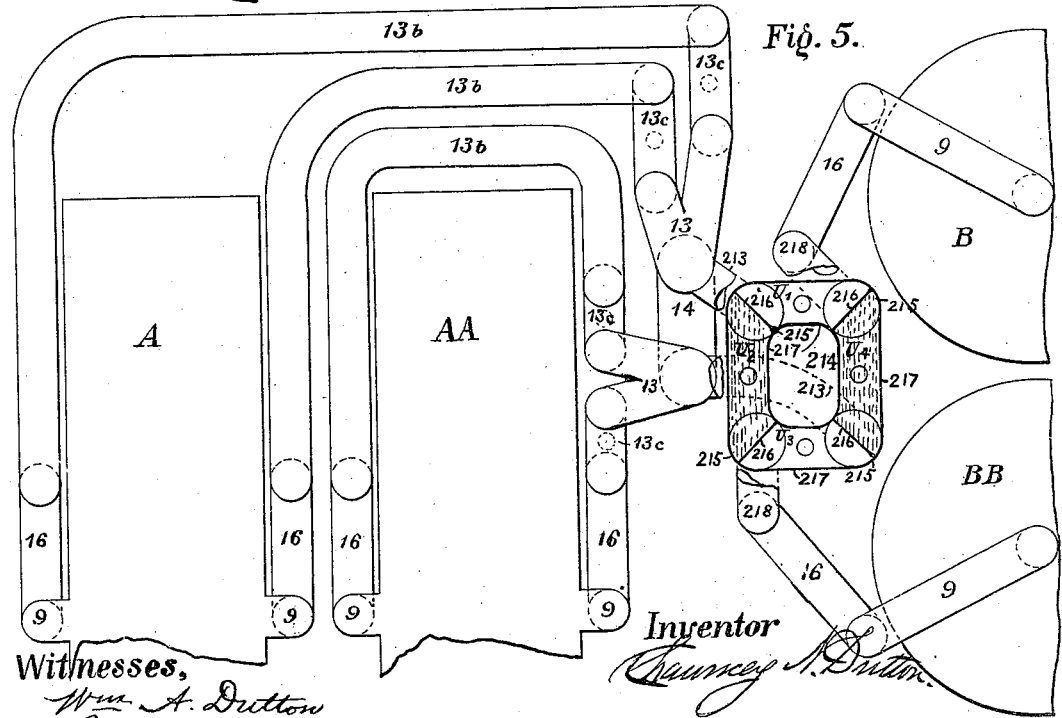
Witnesses,
Wm. A. Dutton
Julia M. Pond
Inventor
Chauncey N. Dutton

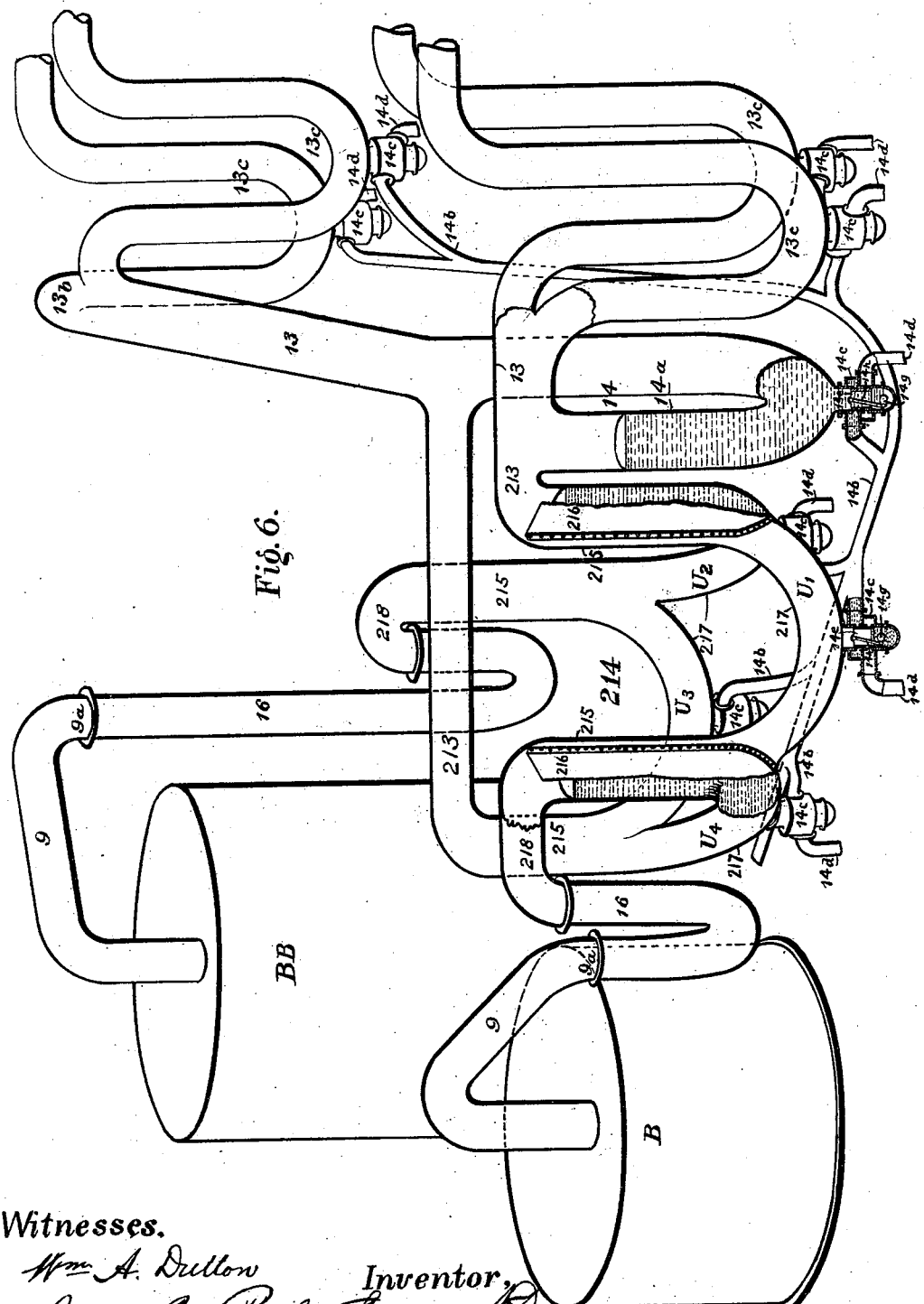

(No Model.) 6 Sheets—Sheet 6.
C. N. DUTTON.
PNEUMATIC BALANCE LOCK.
No. 557,566. Patented Apr. 7, 1896.
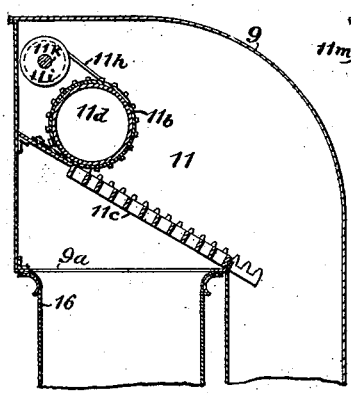
Fig. 7.
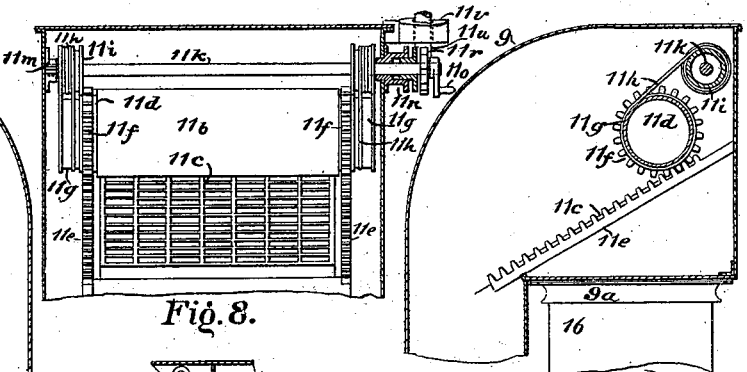
Fig. 8.
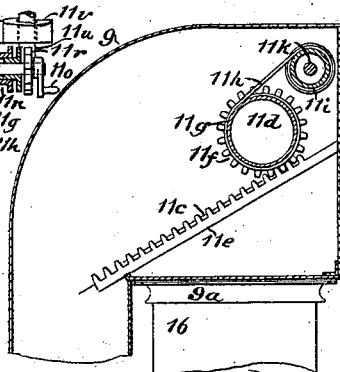
Fig. 9.
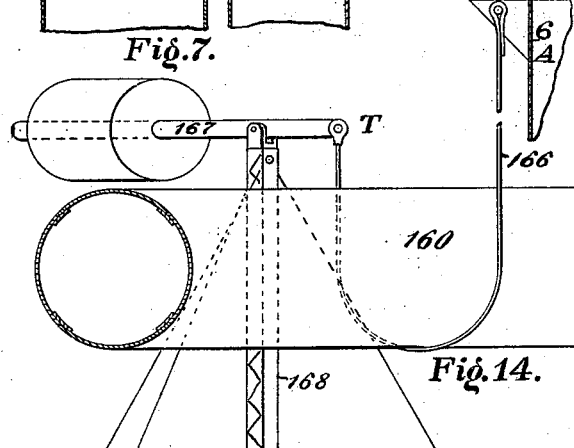
Fig. 14.
Fig. 10.
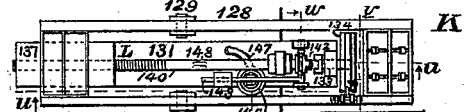
Fig. 16.
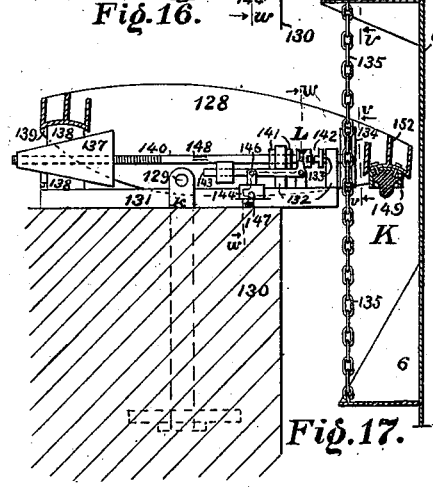
Fig. 17.
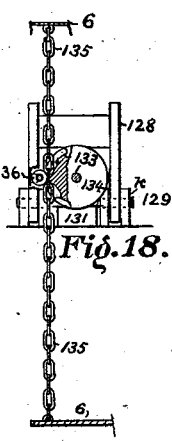
Fig. 18.
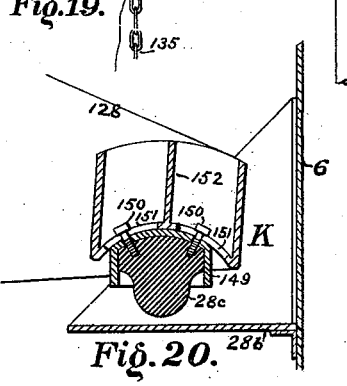
Fig. 15.
Fig. 19.
Fig. 20.
Witnesses,
Wm. A. Dutton
Julia M. Pond
Inventor
Chauncey N. Dutton

UNITED STATES PATENT OFFICE.

CHAUNCEY N. DUTTON, OF NEW YORK, N. Y.

PNEUMATIC BALANCE-LOCK.

SPECIFICATION forming part of Letters Patent No. 557,566, dated April 7, 1896.

Application filed May 20, 1895. Serial No. 549,957. (No model.)

*To all whom it may concern:*

Be it known that I, CHAUNCEY N. DUTTON, a citizen of the United States, residing in the city, county, and State of New York, now temporarily sojourning in Albany city and county, in said State, have invented certain new and useful Improvements in Pneumatic Balance-Locks, of which the following is a specification.

My present invention consists in improvements in the construction and operation of pneumatic balance-locks of the general type described in my Patent No. 457,528 of August 11, 1891, and in my application, Serial No. 529,885, of November 24, 1894.

In the application above referred to I have recited that it is generally undesirable to so construct a pneumatic lock that its weight when loaded will be in practical equilibrium with the lifting effort of the compressed-air charge, and that the best practical results will be obtained by making the lock either superbuoyant and restraining it from rising too high by suitable stops and anchorings or by making it heavier than the lifting effort of the air-charge and supporting it partly by the air-charge and partly by an auxiliary apparatus.

In my Patent No. 457,528 I describe a superbuoyant lock and in the application Serial No. 529,885 an overweighted one. In this application I describe a superboyant lock which possesses important functional advantages over those referred to, being cheaper to build, simpler, and more reliable and positive in operation.

The main elements of a pneumatic lock must in all cases be the same. There must be at least two movable members, which constitute the parts of a balance. Each must have a downwardly-opening air-chamber, and one at least must have in its deck a gated lock-chamber. Such a structure is top heavy, and its tendency is to pitch and tilt. The art of designing a pneumatic lock therefore consists largely in so proportioning and controlling it that it may be positive in its functions and restrained from undesirable or uncertain motions.

My aim therefore is to make a pneumatic lock which shall be rigidly supported when in its elevated position, which shall automatically adjust itself to the level of the water in which it floats when depressed, which shall be under perfect control and absolutely synchronized during its traverse, which shall at all times be maintained perfectly level, and which cannot fall. These objects are obtained by the very simple and reliable methods hereinafter described and shown in the drawings, in which—

Figure 1 is a general plan. Fig. 2 is a transverse section on the line $x\,x$ of Figs. 1 and 3. Fig. 3 is a side view with the retaining structure shown in section. Fig. 4 is a top plan view of the air-pipe system; Fig. 5, a plan thereof on a lower plane; Fig. 6, a sort of perspective sketch thereof. Figs. 7, 8, and 9 are sectional views of a safety cut-off valve used in the goosenecks on the sides of the locks, and Fig. 10 a view of a release mechanism to the said valve. Fig. 11 is a section, and Figs. 12 and 13 isometrical views, the latter partly in section, of a pneumatic weir used to control the supply of water by which I adjust the weights of the balance-tanks or pneumatic accumulators B. Fig. 14 is a view of a synchronizing hollow shaft and pinion and supports to the same. Fig. 15 is a view of one style of adjustable stops for holding down the superbuoyant lock. Fig. 16 is a plan of another type of adjustable stops; Fig. 17, a section thereof on the line $u\,u$ of Fig. 16; Fig. 18, a section on the line $v\,v$ of Figs. 16 and and 17; Fig. 19, a section on the line $w\,w$ of the same figures; and Fig. 20, an enlarged section of the overhanging end and buffer, on the line $u\,u$ of Fig. 16.

As described in my patent and application above referred to, I suitably locate my lock where it is desired to transfer vessels in a waterway between a lower level 2 and an upper level 1 thereof, and I build a head-wall 3 or other suitable structure to support and retain the upper level. In said head-wall 3 I provide openings 4, and gates $4^a$, and safety-gate $4^b$, so that vessels may be admitted to and from the locks and the water retained in the level 1, as desired. Adjacent to the head-wall 3 I expand and deepen the lower level 2 to form a pit or well 5.

Floating and moving vertically in the water of the lower level in the pit 5 are similar locking members A AA, each made with an openbottomed lower air-chamber 7, adapted to retain a compressed-air charge by a seal formed by permanently immersing the lower walls 6 thereof in the water of the pit 5, and an upper-gated lock-chamber or trough 17, with end openings 18 and gates 18$^a$.

The details of construction generally are similar to those shown in my application, Serial No. 529,885, above referred to, except that the curvilinear outer walls 6 of the air-chambers 7 do not extend upward above the floor 71 of the lock-chamber 17, but instead terminate thereabout, butting against and being united with outwardly-projecting and somewhat downwardly-inclined plates 31, which plates may be extensions of the floor 71 or suitably joined thereto.

The walls 6 are disposed in curved surfaces, being segments of cylinders with nearly vertical axes united at their tops with the plates 31 and at their intersections with transverse partitions or ties 8. The upper part G of the structure constitutes a box-girder adapted to resist all strains due to extraneous forces, and the walls 6 are united with and suspended from it. It has for flanges the floor 71 of the lock-chamber 17 and the top plates 72 and fenders 73, which are united with the side walls 70 of the lock-chamber, which form the web of the girder, and for stiffeners the frames 74$^a$.

To hold down the floor 71 of the lock against the air-pressure, I provide transverse girders 74, of which those 74$^a$ are upward extensions, and Z-bars 75 united thereto and to the floor 71, and at the intersections of the curvilinear walls 6 and the ties 8 and elsewhere, where special stiffness is required, I provide additional girder constructions 76. I also provide balance-tanks or pneumatic accumulators B BB and valve-controlled pneumatic conduits 13, adapted for the passage of air between the movable members.

To connect the movable members with an air-main 13 on *terra firma*, I provide air-conduits in the form of goosenecks 9, each having a flanged downward opening 9$^a$, adapted to be connected with one end of a loop of flexible tubing 16, the other end of which is connected with a similar opening 13$^a$ on the air-main 13.

The goosenecks 9 on the balance-tanks B rise from the center and overhang the sides. Those on the lock-members A are formed in upward extensions of the side walls thereof and are each provided with a safety cut-off valve 11. The air-main 13 has branches 13$^b$, extending conveniently to the goosenecks on the locks, and each such branch has a cut-off valve 13$^c$, so that any gooseneck or branch can be cut off, if desired.

A main controlling-valve 14 is located in the air-main 13, by manipulating which the locks can be operated and controlled. This valve 14 is made of a U or return bend 14$^a$ of the main 13, with a bottom three-way water-valve, its case being numbered 14$^c$, and a water-supply pipe 14$^b$ and exhaust 14$^d$, and a hollow piston-valve 14$^e$, operated by a crank-shaft and crank 14$^g$ and connecting-rod 14$^h$. The air is controlled by manipulating the valve 14$^e$ to admit water to and exhaust it from the return-bend 14$^a$, trapping and untrapping it, as fully set forth in the application above referred to.

Between the balance-tanks B and the main air-valve 14 is a system of pipes and valves adapted to connect either of the balance-tanks or accumulators B or BB with either of the locks A or AA, or cut such connections. To facilitate such connections, I provide a four-square compound water-seal valve 214 with four vertical corner-legs 215, each having a vertical partition 216 placed diagonally and extending from the bottom nearly to the top and dividing the legs 215 into two vertical divisions, which open into one another over the top of the partition 216, and I connect these divisions, two and two, by lower branches 217, and on each branch provide a three-way water-valve 14$^c$ with water-supply 14$^b$ and exhaust 14$^d$, so as to form a combination of four valves U' U$^2$ U$^3$ U$^4$, similar in design to the main valve 14. The said valves are independent as regards the trap parts; but each connects with the adjacent ones above the partitions 216 in the corner-legs 215.

I connect the legs 215 on two opposite corners, each with one leg of the main valve 14 at the tops thereof, by pipes 213, and at the top of each of the remaining legs 215 I form a gooseneck 218, and connect it by a suspended loop of flexible tube 16 with the gooseneck 9 on one of the accumulators B or BB.

I control the connection between the accumulators and the locks by admitting water to and exhausting it from the valves U' U$^2$ U$^3$ U$^4$, the water-valves 14$^c$ being manipulated to that end. When all the said valves are trapped, no air can pass. When U$^2$ and U$^4$ only are trapped, as shown by the water-lines in Figs. 5 and 6, the accumulator B connects with the lock A and BB with AA. Were U' and U$^3$ trapped and U$^2$ and U$^4$ not trapped, B would connect with AA and BB with A.

I provide a safety cut-off 11 in each gooseneck 9 on the locks A.

The valve is preferably a sheet of rubber or other flexible material 11$^b$, attached at its upper edge to the valve-body and at its lower edge to a roller 11$^d$. The valve-seat 11$^c$ is in the form of a gridiron, inclined at a considerable angle, and has racks 11$^e$ at its sides. The roller 11$^d$ has spur-gears 11$^f$ on its ends, adapted to mesh with the racks 11$^e$, and drums or sheaves 11$^g$, to which I fasten cords 11$^h$, which pass up to winding-drums 11$^i$ on a shaft 11$^k$, above and parallel to the gridiron 11$^c$ and roller 11$^d$. The shaft 11$^k$ has suitable bearings 11$^m$, and one end passes through a gland 11$^n$ in the wall of the gooseneck 9, and has a handle 11$^o$, by which the shaft may be turned, and a releasing mechanism 11$^p$, consisting in a ratchet-wheel 11$^r$ and pawl 11$^s$, the pawl being pivoted centrally on a fulcrum 11$^t$ and at its end to the soft-iron core 11$^u$ of a solenoid 11$^v$. When it is desired to close the valve 11, a switch is thrown and an electric current passed through the solenoid 11$^v$, the core 11$^u$ is drawn up, the pawl 11$^s$ is disengaged from the ratchet-wheel 11$^r$, and the shaft 11$^k$ being free to revolve, the heavy roller 11$^d$ rolls down and deposits the sheet of rubber 11$^b$ on the gridiron and shuts off the air. When the valve is to be opened, the shaft 11$^k$ is turned by the handle 11$^o$, the cords 11$^h$ are wound on the drums 11$^i$, and the roller 11$^d$ is rolled over the gridiron, picking up the rubber sheet-valve 11$^b$, which is wrapped upon the roller. The engagement of the gears 11$^f$ on the roller with the racks 11$^e$ on the valve-seat 11$^c$ prevents the roller from sliding and leaving the rubber valve 11$^b$ partly covering the seat when the valve should be open.

In order to vary the load on the pneumatic accumulators B BB and the air-pressure therein, I provide on the tops thereof receptacles 117 adapted to hold water, the side walls being extended upward for that purpose. I also provide a channel or conduit 118 for bringing water from the upper level 1 of the canal, or from any convenient source, to the receptacles 117 on top of the accumulators B, and in the conduit 118 I locate pneumatic weirs 119 and similar weirs 119$^b$ on the accumulators, by which means water can be fed into or drawn out of the receptacles 117 to vary the weights of the accumulators. These pneumatic weirs are shown in detail in Figs. 11, 12, and 13.

The pipe or channel 120 forming the weir communicates with the conduit or other receptacle from which it is to discharge water, considerably below the surface of the water, by an opening 121. The channel 120 is bent like a letter ∽. From the opening 121 it rises to a bend 122, then descends considerably below the opening 121, and rises again to or nearly to the level of the bend 122, and discharges through an open end. All parts of the weir are below the water-level. In the upper wall of the bend 122 I locate an air-supply valve 123, connected by a pipe 124 with a source of compressed air, and an exhaust-air valve 125. The operation of this pneumatic weir is as follows: So long as no compressed air is in the bend 122 the weir will discharge freely. If the valve 123 be opened and compressed air be admitted to the bend 122, it will force down the water in the legs of the weir-channel 120 and cut off the flow of the water, and if too much air enters it will escape through the opening 121, which is made on a higher level than the lower bend of the channel 120, to that end. When it is desired to again operate the weir, the exhaust-valve 125 is opened and the air exhausted from the bend 122, permitting the water to flow again.

I provide interlocking parallel guides 28 on the head-wall 3 and on the locking members A AA, by which the locks are held in position to register with the gated openings 4 when elevated and held in position in front of the said openings against the hydrostatic pressure tending to force them away.

The locking members A AA are made superbuoyant by so adjusting and controlling the pressure of the charge of compressed air relatively to the weight of the locking member and the surface against which the air operates that the locking member, when elevated, is thrust upward and held firmly by the air-pressure against anchors or stops K, the strain thereby induced in the anchors or stops K being quite considerable, as, say, one-quarter of the weight of the loaded locking member A AA, so that the load or the air-pressure can vary considerably without affecting the stability of the lock in its elevated position.

The depressed lock, except while being manipulated, is cut off pneumatically from the elevated lock and from the accumulators B BB, and floats like a pontoon upon such air as may be within its air-chamber 7. It can therefore adjust itself to fluctuations of the water in the lower level 2, in which it floats.

To adjust the traverse of the locks to compensate for fluctuations of the surface of the water in the upper level 1 of the canal, I provide nuts 30 on the anchor-rods $k$, Figs. 2, 3, and 15, which can be adjusted by hand, to regulate the height of the stops 28$^a$. The stops arrest and hold the lock by engaging projections 28$^b$ on the wall 6 of the lock, and elastic buffers 28$^c$ are interposed to prevent shocks.

An alternative construction of stops, more quickly adjustable, is shown in Figs. 16, 17, 18, and 19, in which levers 128 are attached to the anchor-rods $k$ by pin-bearings 129 or otherwise, the rods being built into suitable piers or walls 130 and the levers 128 located thereon, with one end overhanging, so as to engage the projections 28$^b$ on the wall 6 of the lock A and stop the lock. To quickly adjust the outboard ends of the lever 128, I provide, in connection with such lever, an adjusting mechanism L, which is designed to be operated by temporarily connecting it with the lock member A while the latter is moving, such motion being synchronized and suitable to operate a number of such stops all at the same time and equally. I therefore provide a suitable bed-frame 131 on the wall 130, and overhanging the edge thereof. At the outer end of this frame 131 I provide a bearing 132 for a shaft 133, on which is a sprocket-wheel 134, adapted to engage a vertical chain 135, attached at its ends to the lock-wall 6. An idle roller 136 keeps the chain from slipping off the wheel. I provide a wedge 137 at the inner end of the frame 131 with bearing-blocks 138, the lower one attached to the frame, the upper one having a curved upper surface and bearing against a concentric surface 139 on the inner end of the lever 128.

This arrangement permits the parts to adjust themselves so that the pressures are delivered normally to the engaged surfaces, whatever the position of the parts.

In the wedge 137 I make a female screw and provide a threaded bar or shaft 140, working therein, the far end of the shaft being supported in a bearing 132 and restrained from longitudinal motion by collars 141. The shafts 133 and 140 are axial and their ends are close together, and a clutch 142 is provided for locking the shafts, so that they will turn together when desired. The lever 143, which throws the clutch, extends to a pneumatic cylinder 144, having a piston 145, connected with the lever 143 by a link 146.

A valve-controlled air-pipe 147 connects the cylinder 144 with a source of compressed air. When the operator desires to manipulate the adjusting mechanism L to adjust the stops K, he admits air to the pipe 147. The pistons 145 are forced out, moving the levers 143 and engaging the clutches 142, so that the shafts 140 and 133 will turn as one piece, and as the lock member A moves the shafts are rotated by the wheels 134 engaging the chains 135, and the wedges are moved by the agency of the screws on the shafts 140 engaging the females in the wedges, and the levers 128 are thereby adjusted.

To turn the shafts by hand, wrenches may be fitted on prismatic sections 148 of the shafts, to that end provided.

The overhanging end of the lever is provided with a striking-block 149 having a curved upper surface, and a concentric surface on the lever, so that pressures may be delivered to normal surfaces. The block 149 is held in position by bolts 150, which slide in slots 151 in the end block 152 of the lever and screw into the elastic buffer $28^c$ in the striking-block 149, such a detail holding the parts together firmly and adjustably.

To keep the lock members A AA from pitching endwise, I provide an auxiliary apparatus C, consisting of synchronizing-shafts 160, which extend horizontally along beside the locks and have pinions 161 on their ends. The shafts 160 are made hollow to combine lightness with strength. The best form of pinion is the lantern-pinion, Fig. 14, the teeth being formed of pins 162, fastened in flanges 163 on the hollow shaft 160. The pins 162 engage with racks 164 on the lock and other racks 165 on *terra firma*. The racks 164 are fastened to the walls 6 of the lock or to girder constructions 76 framed therewith. The racks 165 are carried on suitable frames 51 on *terra firma*. The shafts 160 have no bearings, being hung on the racks 164 165 by the engagement therewith of the teeth 162 of the pinions 161, the friction being thus reduced to a minimum.

This apparatus synchronizes the lock members A AA, for should one end thereof tend to move unequally relatively to the other end a torque is produced in the shafts 160 by the effort of the lock to revolve the two ends thereof at differing rates, and thus the unequal motion is prevented. The shafts have a rolling motion, and their travel is one-half that of the locks.

Where the shafts become unduly long I may provide intermediate supports to relieve them of the strains due to their weight. Such a support is shown in Fig. 14, and consists in a cord 166 attached at one end to the lock-wall 6 and at the other to an automatic tension apparatus T, which may be a weighted lever 167, supported and pivoted on a post or frame 168 on *terra firma*. The cable passes under the shaft 160 and has the same rate of motion, and the weighted lever takes up the stretch of the cable and any slight irregularity which might otherwise cause trouble. The shafts and pinions act as rollers also to keep the upper parts of the locks from tilting sidewise. I provide lower guiding-rollers 69 to perform this office at the bottom of the locks A AA.

Having thus described my invention in detail, I will now explain its operation.

In the drawings I show the lock A elevated and connecting with the accumulator B, and the lock AA depressed, being cut off from all communication with the other moving parts and floating like a pontoon. The elevated lock A is overcharged with compressed air by reason of its free communication with the accumulator B, which carries its maximum load, and induces a maximum pressure within itself and the lock A with which it communicates, said pressure being so high as to cause a lifting effort on the lock A, say one-fourth greater than the downward effort of the fully-loaded lock. The excess of lift is resisted by the anchors K and induces corresponding strains in them. The load on the lock or the air-pressure can vary without affecting the stability of the elevated lock until such variation is sufficient to nullify the strains in the anchors K. Variations in the density of the air-charge due to changes in the density and temperature of the adjacent atmosphere are automatically compensated by movements of the accumulator B, which keeps the working pressure above atmosphere constant, however much the total pressure may vary. The elevated lock A contains a maximum load, say ten feet of water, and the air-pressure therein, due to the weighted accumulator B, is also a maximum, say five pounds ten ounces. The depressed lock contains a less depth of water, say nine feet three inches, and the air-pressure therein is in equilibrium with the load, say four pounds nine ounces. If now it be desired to manipulate the locks, the gate $4^a$ in the head-wall opening 4 and those $18^a$ in the locks are closed, the water between the gates $4^a$ and $18^a$ is allowed to run off, the accumulators are shut off from the lock, and the valve 14 in the air-main 13 is opened, establishing communication between air-chambers of the locks A and AA. The air in the elevated lock A being at the higher pressure expands into the depressed lock AA and raises it, and as the air-charge expands and the pressure decreases the water rises into the air-chamber of the lock A and expels still more air into the now ascending lock AA. As the lock AA rises, the weight of the water upon the side plates 31 continually decreases, and when the lock is elevated, say five feet, the total weight of the water in its lock-chamber and upon the side plates 31 is less than the weight of the water in the elevated lock A, and the elevated lock A will overbalance the ascending lock AA and begin to descend, forcing air from its chamber into that of the ascending lock, and the traverse of the two locks will continue until the ascending lock AA brings up against the stops K and the descending lock reaches a position where equilibrium is established between its downward effort and the resistance to further compression of the compressed air. The valve 14 is now trapped, cutting off the pneumatic connection between the locks A and AA. At this time the side plates 31 on the lock A are considerably submerged and the pressure of the air in the two locks is due to the weight of the lock A with, say, ten feet of water in its lock-chamber and, say, seven feet of water on the side plates 31 and is considerably in excess of the pressure necessary to sustain an elevated lock even when fully loaded, because the elevated lock has no load on its side plates 31. The gates 18$^a$ and 4$^a$ can now be opened and the lock AA connected with the upper level. To increase the stability of the newly-elevated lock, however, it is desirable to connect it with one of the accumulators, as BB. The valve U$^3$ is therefore untrapped and the air from the loaded accumulator BB admitted to the now elevated lock AA, inducing the maximum lifting effort of the air therein and stability of the lock. The lock A is not yet fully depressed, for it must be remembered that the normal charge of air in an elevated lock operated on this system is at a very high pressure and when it expands to equilibrium with the loads it increases considerably in bulk. It is therefore necessary to discharge a portion of the air out of the now partly-depressed lock A. To this end, therefore, the surcharge of water has been run out of the receptacle 117 on the accumulator B, and the air-pressure therein is now consequently considerably below the pressure in the lock A. The valve U' is opened, establishing communication between them, and a part of the air drawn from the lock A into the accumulator B, permitting the lock to descend to its normal depressed position. The valve U' is then trapped and the now depressed lock A left floating.

From the above description of the operation of the locks by this system it is evident that while the pneumatic accumulators are a convenience and economy they are not absolutely necessary parts of the system, and they may be replaced by a motor 32 and air-compressor 33, the extra compression of the air in the elevated lock being obtained by these agencies, and the excess portion of the air-charge being discharged into the atmosphere when the elevated lock is lowered. I may operate small locks in this way with great economy.

Having thus described my invention, what I claim as new, and desire to secure by Letters Patent, is—

1. In a balance-lock for waterways, the combination of a structure, with gated openings, retaining the higher level and a pit formed in the lower level of the waterway, a movable locking member adapted to operate in the pit, and having a gated lock-chamber and a downwardly-opening air-chamber with its lower walls sealed in the water of the lower level of the waterway, a charge of compressed air in the said air-chamber which when the locking member is elevated renders it superbuoyant and holds it up against stops, stops or anchors which restrain the upward tendency of the locking member when elevated, a second movable member having a downwardly-opening air-chamber with sealed lower walls, a valve-controlled conduit connecting the air-chambers of the movable members, and an auxiliary synchronizing apparatus connected with the locking member, substantially as set forth.

2. In a balance-lock for waterways, the combination of a structure with gated openings retaining the higher level and a pit formed in the lower level of the waterway, a movable locking member adapted to operate in the pit and having a gated lock-chamber and a downwardly-opening air-chamber with its lower walls sealed in the water of the lower level of the waterway, a charge of compressed air in the said air-chamber, which when the locking member is elevated renders it superbuoyant and holds it up against stops, stops which restrain the movable member when elevated, a second movable member with a downwardly-opening air-chamber with sealed lower walls, a valve-controlled conduit connecting the air-chambers of the movable members, and an auxiliary synchronizing apparatus connected with the movable locking member and consisting in shafts having pinions which mesh with and roll between vertical parallel racks, substantially as set forth.

3. The combination with a movable member adapted to transfer a vessel between a higher and a lower level in a waterway, of a synchronizing apparatus consisting in racks attached to the movable member, similar fixed parallel racks upon *terra firma*, and shafts provided with pinions, the teeth of which engage the racks on the locking member on one side and those on *terra firma* on the other, and which roll between the racks during the traverse of the locking member, substantially as set forth.

4. In combination with a synchronized moving member, a synchronizing-shaft provided with pinions and rolling between parallel racks with which the said pinions mesh, a flexible support passing under the shaft and attached at one end to the movable synchronized member, at the other to a tension apparatus, which takes up the stretch of the flexible support, substantially as set forth.

5. In a balance-lock for waterways, the combination of a structure with gated openings retaining the higher level and a pit formed in the lower level of a waterway, and a movable locking member adapted to operate in the pit adjacent to the said structure and having a gated lock-chamber and a downwardly-opening air-chamber adapted to retain compressed air by sealing its lower walls in the water of the lower level, a second movable member having a downwardly-opening air-chamber with sealed lower walls, a valve-controlled air-conduit connecting the said air-chambers and an auxiliary synchronizing apparatus connected with the first-named movable member and consisting in shafts provided with pinions, racks on the locking member and parallel fixed racks on *terra firma*, the teeth of the pinions on the shafts meshing on one side with the racks on the locking member, on the other side with the parallel racks on *terra firma*, and the shafts and pinions rolling between the said racks during the motion of the member substantially as set forth.

6. In a parallel or synchronizing motion for locks, the combination of a hollow shaft with lantern-pinions formed thereon, racks on the moving member, and parallel fixed racks on *terra firma*, the pinions meshing with the parallel racks and rolling between them during the traverse of the moving member, substantially as described.

7. In a balance-lock for waterways the combination of a structure with gated openings retaining a higher level and a pit formed in the lower level of the waterway, two similar moving locking members adapted to operate in the pit, each having a gated lock-chamber and a downwardly-opening air-chamber with its lower walls sealed in the water of the lower level, a charge of compressed air in the movable locking members adapted to render the locking members superbuoyant when elevated, and hold them at such times up against stops, stops adapted to restrain the locking members when elevated, a valve-controlled conduit or conduits adapted to connect the air-chambers of the locking members with one another, and auxiliary synchronizing apparatus connected with each of the locking members, substantially as set forth.

8. In a balance-lock for waterways, the combination of a structure with gated openings retaining a higher level and a pit formed in the lower level of the waterway, two similar movable locking members adapted to operate in the pit, each having a gated lock-chamber and a downwardly-opening air-chamber with its lower walls sealed in the water of the lower level, a charge of compressed air in the movable locking members adapted to render the locking members superbuoyant when elevated and hold them at such times up against stops, stops adapted to restrain the locking members when elevated, a valve-controlled conduit or conduits adapted to connect the air-chambers of the locking members with one another and auxiliary synchronizing apparatus connected with the locking members and consisting in shafts at the sides thereof having pinions formed on them and adapted to mesh with and roll in opposite parallel racks on the locking members and fixed on *terra firma*, substantially as set forth.

9. In a balance-lock for waterways, the combination of a structure with gated openings retaining a higher level and a pit formed in the lower level of the waterway, two similar movable locking members adapted to operate in the pit, each having a gated lock-chamber and a downwardly-opening air-chamber with its lower walls sealed in the water of the lower level, a charge of compressed air in the movable locking members adapted to render them superbuoyant when elevated and hold them, at such times up against stops, stops adapted to restrain the locking members when elevated, auxiliary synchronizing apparatus connected with the locking members, consisting of shafts with pinions thereon adapted to mesh with and roll between opposite parallel racks on the movable locking members, and fixed on *terra firma;* valve-controlled conduits adapted to connect the air-chambers of the locking members with one another and with the air-chambers of pneumatic accumulators, a pneumatic accumulator adapted to connect by a valve-controlled conduit with each of the locking members and having a receptacle on its top for retaining a charge of water, and a valve or weir for discharging the same, and a conduit with a valve or weir adapted to charge the receptacle on the pneumatic accumulator with water, substantially as described.

10. In combination with pneumatic balance-locks and pneumatic accumulators, an air-conduit adapted to connect the air-chambers thereof, a main valve therein adapted to cut off communication between the air-chambers of the locks, and consisting in a return-bend and connected therewith a water-supply, and an inlet and exhaust valve adapted to trap and untrap the return-bend, a similarly-operated four-way compound valve having four separate lower branches or bends, and eight vertical legs, forming four water-seal valves separate at the bottom, but which connect at their tops each leg of one valve with the adjacent leg of two other valves, two air-conduits each connecting one leg of the main valve with one leg of the connected valves, and two air-conduits each connecting one leg of the connected valves with one of the pneumatic accumulators, substantially as set forth.

11. In combination with a receptacle from which it is desired to control the discharge of water or other liquid, a pneumatic weir having an opening into the receptacle below the water-level therein, a branch or channel rising from the opening to a bend, thence descending to a lower bend and ascending to a discharge-opening located lower than the water-level in the receptacle, an air-pipe connecting with a source of compressed air, and an air-supply valve connecting with the upper bend, and an exhaust-valve connecting therewith, by which means compressed air can be admitted to and exhausted from the said upper bend, substantially as set forth.

12. In combination with a receptacle from which it is desired to control the discharge of water or other liquid, a pneumatic weir having an opening into the receptacle below the water-level therein, a tube or channel rising from the opening to a bend and thence descending to a lower bend, which is at a lower level than the opening into the receptacle, and thence ascending to a discharge-opening, an air-pipe connecting with a source of compressed air and an inlet-air valve connecting with the upper bend and an exhaust-air valve connecting therewith, substantially as set forth.

13. In combination with a receptacle from which it is desired to control the discharge of water, a pneumatic weir consisting in a channel having a lower opening into the receptacle, thence rising to an upper bend, thence descending to a lower bend and rising thence to a discharge-opening, all parts of the channel being below the level of the water in the receptacle, an air-pipe and inlet-valve connecting a source of compressed air with the upper bend of the channel and an air-exhaust valve connected therewith, substantially as set forth.

14. In combination with a conduit, a valve-case, a gridiron valve-seat, a flexible valve adapted to cover the openings in the valve-seat, a roller adapted to roll over the gridiron valve-seat, and deposit thereon and pick up therefrom the flexible valve, substantially as set forth.

15. In combination with a conduit a valve-case, a gridiron valve-seat, a valve formed of a sheet of flexible material, a roller upon which the flexible valve is wound to open the valve, and unwound to close the valve, the roller being adapted to roll over the gridiron valve-seat, substantially as set forth.

16. In combination with a conduit a valve-case, a gridiron valve-seat, a flexible valve attached at one edge to the valve-body, at the other to a roller adapted to roll over the gridiron valve-seat, and mechanism for rolling the roller over the seat, substantially as set forth.

17. In combination with a valve-body a gridiron valve-seat, a flexible valve united at one edge to the valve-body at the other to a roller adapted to roll over the seat, a roller as aforesaid having spur-gears which mesh with racks formed on the valve-body, and mechanism for rolling the roller over the seat, substantially as set forth.

18. In combination with a valve-body an inclined gridiron valve-seat, a roller adapted to roll over the seat, a flexible valve united at one edge to the valve-body, at the other to the roller, and mechanism to roll the roller over the seat, substantially as set forth.

19. In combination with a valve-body an inclined gridiron valve-seat, a roller adapted to roll over the valve-seat, a flexible valve united at one end to the valve-body, at the other to the roller, a sheave on the roller, a cord attached at one end to the sheave, at the other to a winding-drum on which the cord is wound and unwound to roll the roller over the seat, substantially as set forth.

20. In combination with a valve-body an inclined gridiron valve-seat, a flexible valve united at opposite edges to the valve-body and to a roller, a roller as aforesaid having gears which mesh with racks on the valve-body, sheaves on the roller, a shaft parallel to the roller, winding-drums on the shaft, cords united to the roller, and to the winding-drums on the shaft, and a handle or mechanism to turn the shaft and operate the roller, substantially as set forth.

21. In combination with a pneumatic lock, an air-conduit, a valve-case connected therewith, an inclined gridiron valve-seat, a flexible valve, a roller upon which the flexible valve is wound, and from which it is unwound, to open and close the valve; a shaft above the roller, cords connecting the roller with the shaft, mechanism for turning the shaft to wind up the cords and draw up the roller to open the valve, and release mechanism which when operated permits the roller to roll down over the seat and close the valve, substantially as set forth.

22. In combination with a movable locking member, a series of adjustable stops adapted to be connected with the movable locking member and adjusted by it all at one and the same time while it is moving, and disconnected from it when the stops are sufficiently adjusted, substantially as set forth.

23. In combination with a movable locking member, a series of adjustable stops each consisting in a lever pivoted on a fulcrum, one end of the lever engaging with the lock-body to arrest its motion, the other end connected with an adjusting apparatus, a mechanism adapted to connect the adjusting apparatus with the lock-body and operate it when the lock is moving, and an independent engaging or clutch apparatus controlled by an operator and adapted to engage the adjusting apparatus with and disengage it from the operating mechanism and the lock-body, substantially as set forth.

24. In combination with a movable locking member, a series of adjustable stops each consisting in a lever pivoted on a fulcrum, one end of the lever adapted to engage the locking member and arrest its motion, bearing-blocks at the other end of the lever, a wedge adapted to be moved between them to adjust the position of the lever; a female thread in the wedge, and a threaded shaft engaging therewith, a wheel which meshes with a vertical meshing member on the lock, a clutch adapted to engage and disengage the wheel and the shaft, and an independent mechanism controlled by an operator and adapted to engage and disengage the clutch, substantially as set forth.

CHAUNCEY N. DUTTON.

Witnesses:
WM. A. DUTTON,
JULIA M. POND.